(12) United States Patent
Lang et al.

(10) Patent No.: US 7,798,030 B2
(45) Date of Patent: Sep. 21, 2010

(54) TWIN CLUTCH TRANSMISSION DESIGN WITH SELECTIVE HYBRID POWER TRANSFER COMPATIBILITY

(75) Inventors: Jügen Lang, Backnang (DE); Heinrich Straub, Stuttgart (DE)

(73) Assignee: Daimler A.G., Stuttgart (DE)

( * ) Notice: Subject to any disclaimer, the term of this patent is extended or adjusted under 35 U.S.C. 154(b) by 525 days.

(21) Appl. No.: 11/787,118

(22) Filed: Apr. 13, 2007

(65) Prior Publication Data

US 2008/0000312 A1   Jan. 3, 2008

Related U.S. Application Data

(63) Continuation-in-part of application No. PCT/EP2005/011003, filed on Oct. 13, 2005.

(51) Int. Cl.
*F16H 3/08* (2006.01)

(52) U.S. Cl. ......................................................... 74/331

(58) Field of Classification Search .................. 74/331, 74/340
See application file for complete search history.

(56) References Cited

U.S. PATENT DOCUMENTS

| | | | | |
|---|---|---|---|---|
| 5,613,401 A * | 3/1997 | Maurizio | ....................... | 74/325 |
| 6,244,123 B1 * | 6/2001 | Hegerath et al. | ............... | 74/325 |
| 6,250,171 B1 * | 6/2001 | Sperber et al. | ................. | 74/331 |
| 6,634,247 B2 * | 10/2003 | Pels et al. | ...................... | 74/329 |
| 6,766,705 B1 * | 7/2004 | Hall, III | ......................... | 74/331 |
| 6,945,893 B2 * | 9/2005 | Grillo et al. | ..................... | 475/5 |
| 7,082,850 B2 * | 8/2006 | Hughes | ........................ | 74/329 |
| 7,175,555 B2 * | 2/2007 | Kozarekar et al. | ............. | 475/5 |
| 2002/0092372 A1 * | 7/2002 | Bowen | ........................ | 74/339 |
| 2002/0177504 A1 * | 11/2002 | Pels et al. | ....................... | 477/3 |
| 2004/0025612 A1 * | 2/2004 | Ahnert et al. | ................. | 74/329 |
| 2004/0144190 A1 * | 7/2004 | Hall, III | ......................... | 74/331 |

FOREIGN PATENT DOCUMENTS

| | | |
|---|---|---|
| DE | 197 45 995 | 9/1998 |
| DE | 198 59 458 | 6/1999 |
| DE | 198 21 164 | 11/1999 |
| DE | 198 50 549 | 5/2000 |
| DE | 199 40 288 | 3/2001 |
| DE | 199 50 679 | 4/2001 |
| DE | 101 33 695 | 3/2002 |
| DE | 101 33 629 | 1/2003 |
| DE | 102 25 331 | 12/2003 |
| DE | 102 43 375 | 12/2003 |
| DE | 103 05 639 | 3/2004 |
| DE | 102 09 514 | 10/2004 |
| DE | 10 2004 062 530 | 10/2005 |
| EP | 1 209 015 | 5/2002 |
| EP | 1 270 301 | 1/2003 |

* cited by examiner

*Primary Examiner*—Ha D. Ho
(74) *Attorney, Agent, or Firm*—Klaus J. Bach

(57) ABSTRACT

In to a modular transmission design for twin-clutch transmissions which are alternatively equipped with, or without, hybrid functionality in particular for use in connection with front-wheel drive motor vehicles, the transmission is designed to optionally accommodate the components providing the hybrid capability.

9 Claims, 4 Drawing Sheets

TWIN CLUTCH TRANSMISSION DESIGN WITH SELECTIVE HYBRID POWER TRANSFER COMPATIBILITY

This is a Continuation-In-Part Application of pending International Patent Application PCT/EP2005/011003 filed Oct. 13, 2005 and claiming the priority of German Patent application 10 2004 050 757.0 filed Oct. 16, 2004.

BACKGROUND OF THE INVENTION

The invention relates to a set of transmissions and a hybrid twin-clutch transmission.

DE 198 59 458 already discloses a twin-clutch transmission in which an electric motor is arranged so as to be offset parallel to a main shaft of the twin-clutch transmission.

It is an object of the invention to provide a particularly compact twin-clutch transmission which can be converted with little structural modifications to form a hybrid twin-clutch transmission.

SUMMARY OF THE INVENTION

In to a modular transmission design for twin-clutch transmissions which are alternatively equipped with, or without, hybrid functionality in particular for use in connection with front-wheel drive motor vehicles, the transmission is designed to optionally accommodate the components providing the hybrid capability.

With the present invention, on the same production line simple twin-clutch transmissions and hybrid twin-clutch transmissions can be produced, as the simple twin-clutch transmission forms the core transmission for the hybrid twin-clutch transmission. A modular system for the manufacture of essentially different transmissions is thereby provided.

The twin-clutch transmissions can be constructed both, with and without, hybrid accessories, in particular for front-wheel-drive vehicles. A transmission arrangement for front transverse drives and front longitudinal drives is for example advantageous as it is possible for front-wheel-drive vehicles, on account of the steering conventionally being arranged at the front, to transmit only a relatively low torque, so that the twin clutch transmissions which are presently not yet designed with a high torque transmitting capacity can advantageously be used here.

Wet multi-plate clutches, as they are known for example from DE 19821164 A1, are particularly advantageously used as in the twin-clutch transmission according to the invention. The wet multi-plate clutches can be provided with an oil cooler which is particularly advantageous. During starting processes, the oil cooler cools primarily the thermally highly loaded twin clutches. After the starting processes, the oil cooler, which has a high cooling capacity for starting, cools primarily the electric motor. The cooling oil for the multi-plate clutches and the electric motor can particularly advantageously be integrated into the oil circuit of the core transmission. The waste heat of the electric motor or the friction power from the starting processes can thereby be incorporated in the thermal management system of the core transmission, so that the core transmission reaches its operating temperature very early, whereby the cooling oil, whose viscosity decreases—that is to say becomes a thin fluid, ensures a high efficiency of the hybrid twin-clutch transmission at an early stage.

In the hybrid twin-clutch transmission, the electric motor and a step-up stage, which introduces the power from the electric motor into the core transmission or, in the generator function of the electric motor during braking operation, re-absorbs said power, can be dimensioned in such a way that the electric motor cannot start the internal combustion engine. Although this makes an additional electric motor starter necessary, a starter motor of this type is inexpensive and its use is particularly advantageous as it permits to omit expensive power electronics for transmitting high starting currents for the hybrid electric motor for starting the internal combustion engine. It is therefore possible for the electric motor for the hybrid function,
the power electronics thereof and
the step-up stage to be designed not specifically for cold start operation—in particular the cold start of a diesel engine—which demands a high torque at low battery power. Said cold start design is not necessary specifically for normal driving operation and adversely affects the efficiency and other functionalities—for example the start/stop functionality—of the hybrid twin-clutch transmission. The hybrid twin-clutch transmission can accordingly particularly advantageously be used, with the same design, both for a diesel engine and also for a spark-ignition engine.

The hybrid twin-clutch transmission according to the invention can particularly advantageously be designed with an installation space which is no longer than that of the twin-clutch transmission without hybrid functionality, so that uniform utilization of the installation space of the engine bay is possible.

It is possible by means of the hybrid twin-clutch transmission according to the invention to meet all customer-relevant demands. For example, it is possible to travel purely under electromotive power without operation of the internal combustion engine. Boost operation is also possible in which an additional torque from the battery-operated electric motor is introduced into the power flow from the internal combustion engine. In boost operation, the driver therefore has sufficient potential available for overtaking maneuvers or fast starting processes.

A further advantage of the invention is the parallel arrangement of the countershafts. The transmission can be of axially shorter design than coaxial transmission concepts in which the two countershafts are in the form of a hollow shaft and an inner shaft. The demands on the bearings are also lower in such transmissions.

The step-up stage which introduces the torque from the electric motor into the twin-clutch transmission is particularly advantageously an axially front-most or rear-most gear set. As a result of said arrangement at one of the transmission ends, the torque reaction forces introduced from the electric motor or via the step-up stage are taken up close to the bearings of the transmission shafts which are situated at the shaft ends and rotatably support the transmission shafts in the transmission housing. One of the bearings can particularly advantageously be arranged axially between the gear sets of the core transmission and
the twin clutch in an interposed separating wall.

It is particularly advantageously possible by means of the electric motor in the function of a generator for braking energy to be introduced into an energy store. This is also referred to as recuperation. The energy store can in particular be a battery, a super-capacitor or a fuel cell.

The invention will become more readily apparent from the following description of a preferred embodiment thereof with reference to the accompanying drawings.

The invention is illustrated specifically first on the basis of the core transmission without hybrid functionality and on the basis of three exemplary embodiments with hybrid functionality:

DESCRIPTION OF VARIOUS EMBODIMENT

Figure 1:
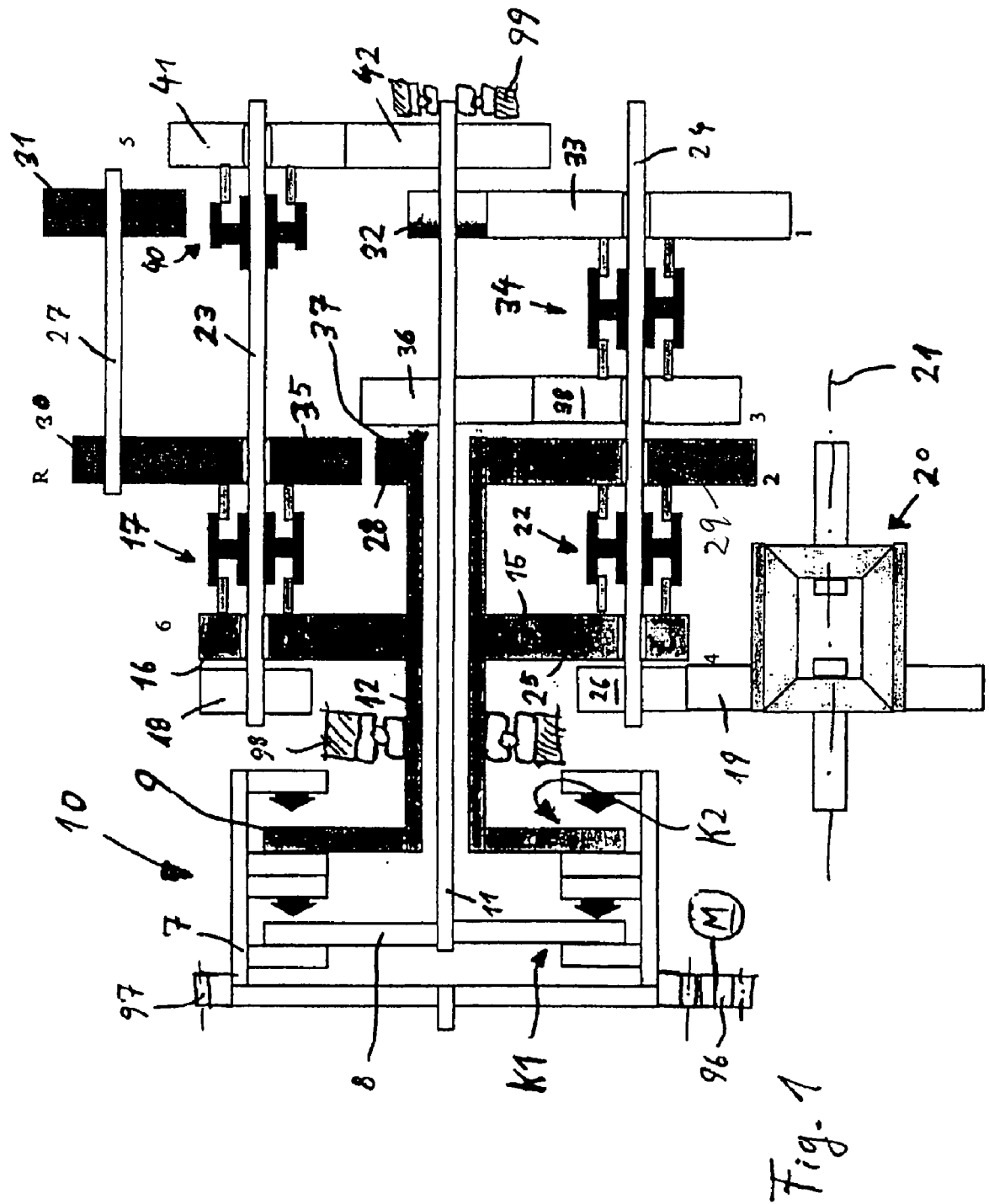
FIG. 1 shows a twin-clutch transmission without hybrid functionality.

FIG. 1 shows a twin-clutch transmission without hybrid functionality. Said twin-clutch transmission is also referred to as the core transmission.

An input-side clutch half 7 of a twin clutch 10 is connected to an internal combustion engine (not illustrated). The input-side clutch half 7 can be alternatively coupled to another clutch half 8 or 9 of two friction clutches of the twin clutch 10.

The one output-side clutch half 9 which is situated axially further away from the internal combustion engine is rotationally fixedly connected to a hollow shaft 12.

The other output-side clutch half 8 is rotationally fixedly connected to an inner shaft 11 which extends coaxially through the second output-side clutch half 9 and the hollow shaft 12 and is supported at the other end in the transmission housing by a roller-bearing. The inner shaft 11 extends through the hollow shaft 12 and beyond the hollow shaft 12.

Extending parallel to, and spaced from, the hollow shaft 12 and the inner shaft 11 are three countershafts 27, 23, 24, of which the countershaft 27 is assigned to the reverse gear R. The two countershafts 23, 24 which are assigned to the six forward gears 1, 2, 3, 4, 5, 6 have, at their front-most end, in each case one drive pinion 18, 26 for a front axle differential 20. The two drive pinions 18, 26 mesh with a drive wheel 19 of the front axle differential 20.

Situated directly behind the two drive pinions 18, 26 which are situated in a plane are three gearwheels in a gearwheel plane, of which gearwheels a large gearwheel is a fixed wheel 15 which meshes with two loose wheels 16, 25 which are arranged each on one of the two countershafts 23, 24. The two loose wheels 16, 25 can in each case be rotationally fixedly coupled by means of a gearshift clutch 17, 22 to the respective countershaft 23, 24.

If the gearshift clutch 17 illustrated at the top in FIG. 1 is displaced forward, then the upper countershaft 23 is rotationally fixedly connected to the upper loose wheel 16, so that the sixth—that is to say highest—forward gear 6 is engaged. Here, the friction clutch K2 is engaged and the friction clutch K1 is disengaged. The drive power is therefore transmitted from the internal combustion engine via the friction clutch K2,
the hollow shaft 12,
the fixed wheel 15,
the loose wheel 16 which is rotationally fixedly coupled by means of the gearshift clutch 17,
the drive pinion 18,
the drive gearwheel 19 and
the front axle differential 20 to the front axle 21.

If, in contrast, the gearshift clutch 22 illustrated at the bottom in FIG. 1 is displaced forwards, then the lower countershaft 24 is rotationally fixedly connected to the lower loose wheel 25, so that the fourth forward gear 4 is engaged. Here, the friction clutch K2 is likewise engaged and the friction clutch K1 is likewise disengaged. The drive power is therefore transmitted from the internal combustion engine via the friction clutch K2,
the hollow shaft 12,
the fixed wheel 15,
the loose wheel 25 which is rotationally fixedly coupled by means of the gearshift clutch 22,
the drive pinion 26,
the drive gearwheel 19 and
the front axle differential 20 to the front axle 21.

Situated axially behind said two gearshift clutches 17, 22 is a further gearwheel plane which includes the reverse gear R and a second forward gear 2. Situated in said gearwheel plane are gearwheels of all three countershafts 23, 24, 27 and of the hollow shaft 12. Said hollow shaft 12 ends in said gearwheel plane. At its end, the hollow shaft 12 is rotationally fixedly connected to a fixed wheel 28 which meshes with a loose wheel 29 of the lower countershaft 24. If the lower gearshift clutch 22 is displaced axially rearwards, then a rotationally fixed connection is established between the countershaft 24 and the loose wheel 29, so that the drive power of the internal combustion engine is transmitted via the friction clutch K2,
the hollow shaft 12,
the fixed wheel 28,
the loose wheel 29 which is rotationally fixedly coupled by means of the gearshift clutch 22,
the countershaft 24,
the drive pinion 26,
the drive gearwheel 19 and
the front axle differential 20 to the front axle 21 once the friction clutch K2 is engaged.

Two gearwheels, which are situated in said gearwheel plane 2, are assigned to the reverse gear R and mesh
with one another and
with none of the other gearwheels of the gearwheel plane.

The one gearwheel is a loose wheel 35 of the upper countershaft 23, and the other gearwheel is a fixed wheel 30 of the countershaft 27 assigned to the reverse gear R. The countershaft 27 supports, axially spaced from the fixed wheel 30, a further fixed wheel 31 which meshes with a fixed wheel 32 on the inner shaft 11. Also situated in the gearwheel plane of the two fixed wheels 31, 32 is the loose wheel 33 which is rotatably supported on the lower counter-shaft 24 and can be rotationally fixedly coupled, by means of a gearshift clutch 34, to the countershaft 24.

If the rotationally fixed connection is established between the loose wheel 33 and the countershaft 24, then the first forward gear 1 is engaged. In the first forward gear 1, drive power is transmitted from the internal combustion engine via the friction clutch K1,
the inner shaft 11,
the fixed wheel 32,
the loose wheel 33 which is rotationally fixedly coupled by means of the gearshift clutch 34,
the countershaft 24,
the drive pinion 26,
the drive gearwheel 19 and
the front axle differential 20 to the front axle 21 once the friction clutch K1 is engaged.

If, in contrast, the gearshift clutch 17 is displaced rearwards, so that a rotationally fixed connection is established between the loose wheel 35 and the upper countershaft 23, then the reverse gear R is engaged and drive power from the internal combustion engine is transmitted
via the friction clutch K1,
the inner shaft 11,
the fixed wheel 32,
the fixed wheel 31 which meshes with the latter,
the countershaft 27,
the fixed wheel 30,
the loose wheel 35 which is rotationally fixedly coupled by means of the gearshift clutch 17,
the countershaft 23,
the drive pinion 18,
the drive gearwheel 19 and
the front axle differential 20 to the front axle 21 once the friction clutch K1 is engaged.

Situated in the axial space between the fixed gears 30 and 31 is a gearwheel plane which is assigned to the third forward gear 3. This gearwheel plane comprises two gearwheels which mesh with one another, one of which gearwheels is a fixed wheel 36 disposed adjacent the end 37 of the inner shaft 11 and rotationally fixedly connected to the inner shaft 11, whereas the other is a loose wheel 38 that can be rotationally fixedly coupled by means of the gearshift clutch 34 to the countershaft 24. If said rotationally fixed connection is established, then the third forward gear 3 is engaged, so that drive power from the internal combustion engine is transmitted
via the friction clutch K1,
the inner shaft 11,
the fixed wheel 36,
the loose wheel 38 which is rotationally fixedly coupled by means of the gearshift clutch 34,
the countershaft 24,
the drive pinion 26,
the drive gearwheel 19 and
the front axle differential 20 to the front axle 21 once the friction clutch K1 is engaged. The axially rearmost gearwheel plane comprises two gearwheels, of which one 42 is connected to the inner shaft 11 and the other is a loose wheel 41 which can be coupled to the countershaft 23 by means of a separate gearshift clutch 40. If said loose wheel 41 is coupled to the countershaft 23, then the fifth forward gear 5 is engaged, so that drive power from the internal combustion engine is transmitted
via the friction clutch K1,
the inner shaft 11,
the fixed wheel 42,
the loose wheel 41 which is rotationally fixedly coupled by means of the gearshift clutch 40,
the countershaft 23,
the drive pinion 18,
the drive gearwheel 19 and
the front axle differential 20 to the front axle 21 once the friction clutch K1 is engaged.

At one end, the inner shaft 11 is roller-bearing-supported within the hollow shaft 12. At its rear end, the inner shaft 11 is roller-bearing-supported in the transmission housing 99 axially directly adjacent to the gearwheel 42 of the transmission stage of an electric motor (not shown in FIG. 1).

In addition to said roller bearing support relative to the inner shaft 11, the hollow shaft 12 is also roller-bearing-supported in a separating wall 98. The separating wall 98 is connected fixedly in terms of movement to the transmission housing 99 and is arranged axially between the twin clutch 10 and the wheel sets of the core transmission. The separating wall 98 adjoins the clutch bell in the axial direction towards the internal combustion engine.

The input-side clutch half 7 of the twin clutch is connected fixedly in terms of movement to said internal combustion engine and has, at its outer periphery, a large toothed ring 97 which engages in a gearwheel 96, of significantly smaller diameter, which is connected to a starter motor M.

Figure 2:
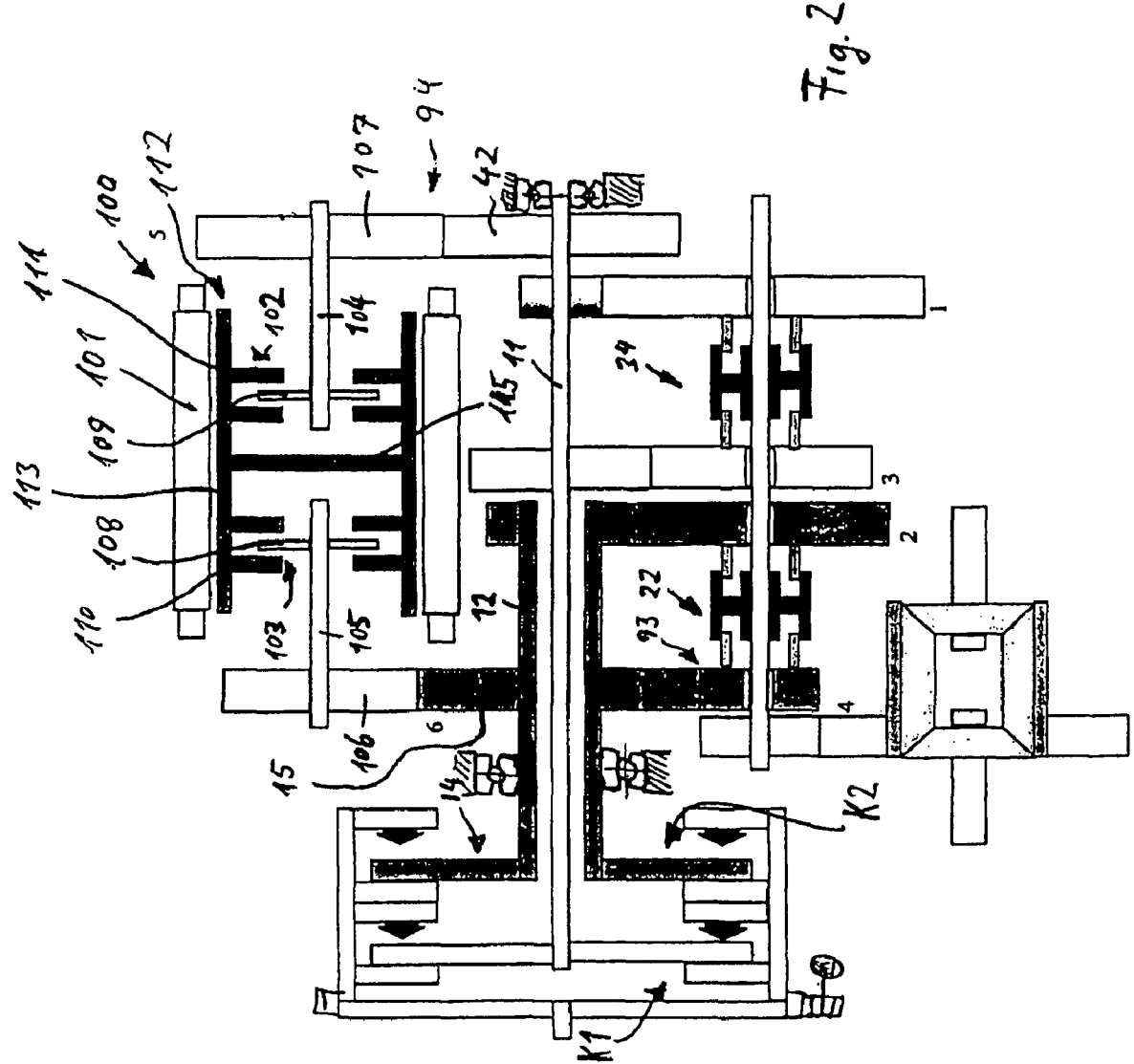
FIG. 2 shows a twin-clutch transmission with hybrid functionality which has parts which are essentially identical with those of the twin-clutch transmission of FIG. 1, wherein an electric motor can be coupled by means of two separate clutches alternatively or at the same time into the power flow of the two partial transmissions of the twin-clutch transmission.

FIG. 2 shows a twin-clutch transmission with hybrid functionality which additionally has an electric motor unit 100. For clarity, the countershaft 27 assigned to the reverse gear from FIG. 1, and the upper countershaft 23, are not illustrated in the drawing. The core transmission is therefore of identical design to FIG. 1. The identical parts are accordingly also provided with the same reference symbols as in FIG. 1.

The electric motor unit 100 comprises
an electric motor 112,
two separate clutches 102, 103,
two countershafts 104, 105 and
two fixed gear wheels 106, 107, with said components being arranged coaxially with respect to one another. The electric motor 112 is composed of the stator windings 101, which are fixed to the housing, and the rotating armature 113.

The electric motor unit 100 extends axially from the gearwheel plane of the fourth forward gear 4 and of the sixth forward gear 6 to the axially rearmost gearwheel plane, with the latter being assigned to the fifth forward gear 5. The axially outer delimitations of the electric motor unit 100 are formed by the two fixed wheels 106, 107. The front fixed wheel 106 meshes with the front fixed wheel 15 on the hollow shaft 12. The rear fixed wheel 107 meshes with the rearmost fixed wheel 42 on the inner shaft 11.

Those ends of the two countershafts 104, 105 which face one another are in each case rotationally fixedly connected to one of the two clutch halves 108, 109. The two second clutch halves 110, 111 which can be coupled in a frictionally engaging manner to said two clutch halves 108, 109 are rotationally fixedly connected to one another and form the rotating armature 113 of the electric motor 112.

Situated axially between the two countershafts 104, 105 is a reinforcement structure 115 of the armature 113.

The six forward gears 1 to 6 and the reverse gear R are of identical design to the first exemplary embodiment as shown in FIG. 1 and are shifted in an identical manner with the two clutches K1, K2 and the four gearshift clutches 22, 34, 17, 40.

If the first clutch 103 of the electric motor unit 100 is engaged, then a torque can be transmitted between the armature 113 and the second friction clutch K2, wherein disposed in the power flow in between is the one step-up stage 93 which is associated with the fixed wheel 15 of the sixth forward gear 6. When the friction clutch K2 is engaged, the power comes from the electric motor unit 100 or flows into the electric motor unit 100, depending on power being introduced into the drivetrain or power being extracted from the drivetrain in order to charge a battery.

If the second clutch 102 of the electric motor unit 100 is engaged, then a torque can be transmitted between the armature 113 and the first friction clutch K1. Disposed in the power flow is the other step-up stage 94 which is associated with the fixed wheel 42 of the fifth forward gear 5. When the friction clutch K1 is engaged, the power is supplied by the electric motor unit 100 or flows into the electric motor unit 100, that is, power is introduced into the drivetrain or power is extracted from the drivetrain in order to charge a battery.

Accordingly, each of the partial transmissions of the twin-clutch transmission is assigned a clutch 102 and 103 of the electric motor unit 100.

Figure 3:
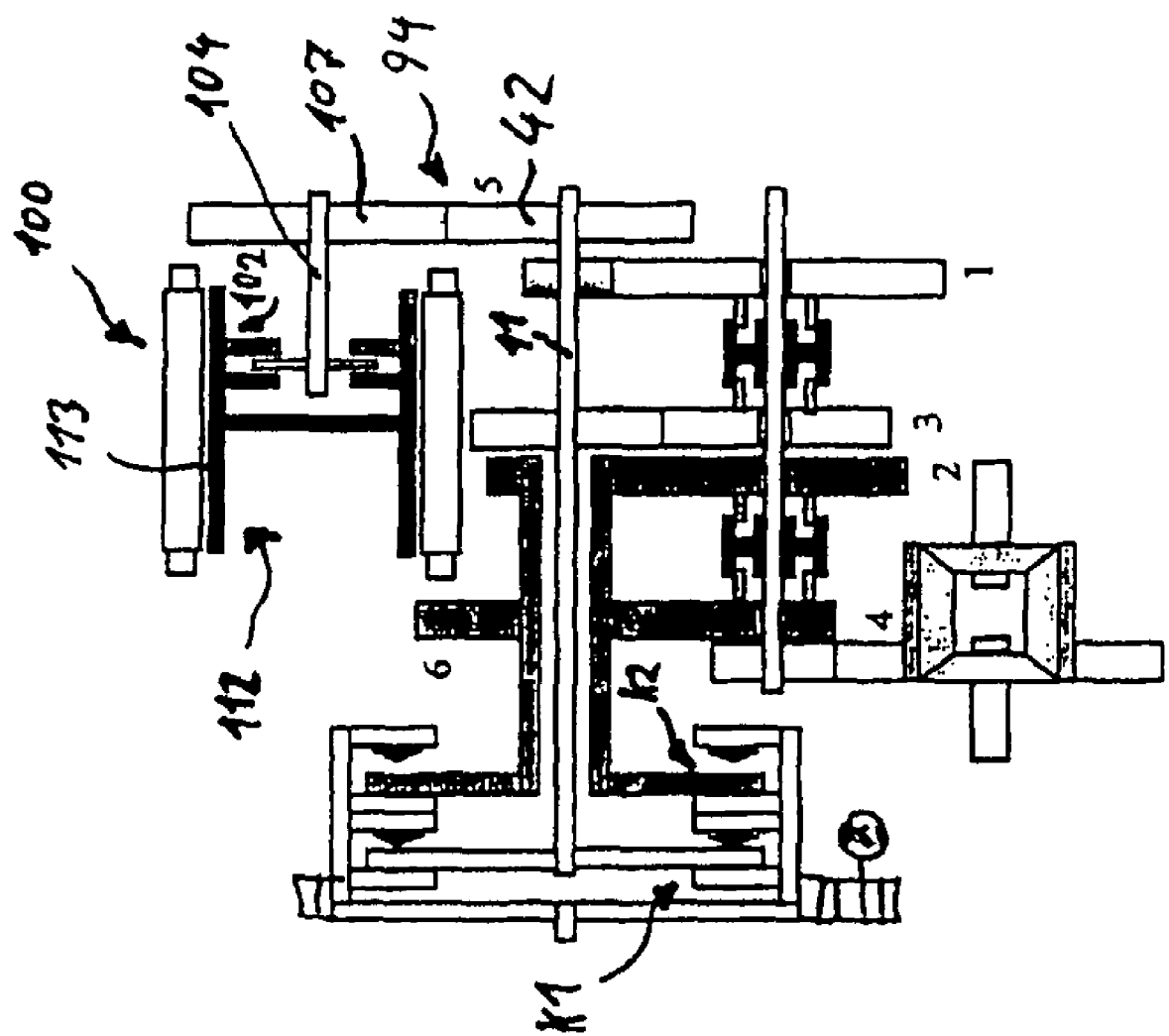
FIG. 3 shows a twin-clutch transmission with hybrid functionality which has essentially the same parts as the twin-clutch transmission of FIG. 1 and FIG. 2, and an electric motor can be coupled by means of one clutch into the one partial transmission of the twin-clutch transmission.

FIG. 3 shows a twin-clutch transmission with hybrid functionality, whose electric motor unit 100, in contrast to the twin-clutch transmission of FIG. 2, has only one single clutch 102 for the electric motor unit 100. For clarity, the countershaft 27 assigned to the reverse gear of FIG. 1, and the upper countershaft 23, are not illustrated in the drawing. The core transmission is therefore of identical design to FIG. 1. The identical parts are accordingly also provided with the same reference symbols as in FIG. 1. In the same way, components which are in principle identical to the exemplary embodiment of FIG. 2 are provided with the same reference symbols.

It is possible by means of the clutch 102 for a rotating armature 113 of an electric motor 112 to be coupled to a fixed wheel 107 which is rotationally fixedly connected to a countershaft 104. Said fixed wheel 107 meshes with a rearmost fixed wheel 42 on an inner shaft 11. A torque from the electric motor 122 can thereby be introduced directly only into the one partial transmission. Similarly, a torque can be introduced directly only from the one partial transmission into the electric motor 122 which is utilized as a generator. The electric motor 122 can, in order to avoid a drag torque which can in certain circumstances adversely affect efficiency, be decoupled by means of the clutch 102.

Figure 4:
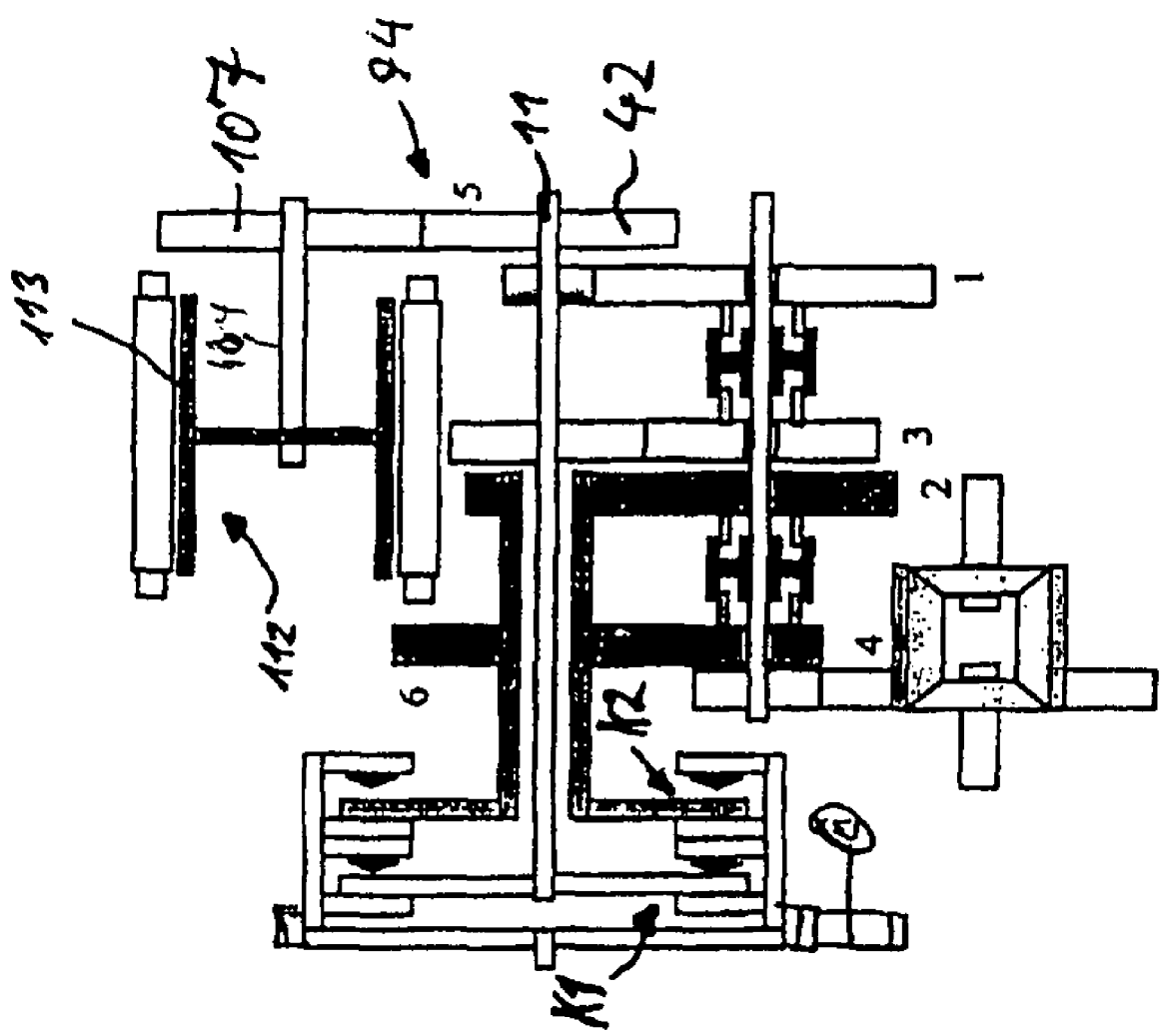
FIG. 4 shows a twin-clutch transmission with hybrid functionality which has essentially the same parts as the twin-clutch transmission of FIG. 1 and FIG. 2 and FIG. 3, with an electric motor being disposed in one partial transmission.

FIG. 4 shows a twin-clutch transmission with hybrid functionality, whose electric motor unit 100, in contrast to the twin-clutch transmission of FIG. 3, has no clutch for the electric motor unit 100. For clarity, the countershaft 27 assigned to the reverse gear of FIG. 1, and the upper countershaft 23, are not illustrated in the drawing. The core transmission is therefore of an identical design as that of FIG. 1. The identical parts are accordingly also provided with the same reference symbols as in FIG. 1. In the same way, components which are in principle identical to the exemplary embodiment of FIG. 2 and FIG. 3 are provided with the same reference symbols.

A rotating armature 113 of an electric motor 112 is fixedly connected to a fixed wheel 107. The fixed wheel 107 is rotationally fixedly connected to a countershaft 104. Said fixed wheel 107 meshes with a rearmost fixed wheel 42 on an inner shaft 11. A torque from the electric motor 122 can thereby be introduced directly only into the one partial transmission. Similarly, a torque can be introduced directly only from the one partial transmission into the electric motor 122 which is utilized as a generator. In order to avoid a permanently present drag torque which adversely affects efficiency, use is made of a friction-optimized electric motor 112, which can alternatively or additionally be equipped with an overrunning clutch.

It is possible with the hybrid transmission designs of FIG. 2, FIG. 3 and FIG. 4 to move the vehicle using only the electric motor unit 100—that is to say without operation of the internal combustion engine. It is likewise possible to travel using only the electric motor unit 100—that is to say without operation of the internal combustion engine. It is therefore also possible to start and stop without a time delay. That is to say, the internal combustion engine which is at operating temperature can be automatically shut off when the vehicle is at standstill, for example at a red light, wherein with a subsequent power demand by the driver, the vehicle is driven immediately by means of the electric motor unit 100, and the internal combustion engine which is at operating temperature is started only while the vehicle is already moving, once, with or without the aid of the starter motor.

In particular for the cold start of high-compression internal combustion engines, such as for example diesel engines, the additional axially offset starter motor M, whose step-up ratio ensures reliable starting, can be necessary in connection with all exemplary embodiments of the hybrid drive of FIG. 2 to FIG. 4.

With the hybrid transmission constructions of FIG. 2, FIG. 3 and FIG. 4, it is also possible to shift between two gears which are assigned to the same partial transmission or the same countershaft 23 or 24 without an interruption in tractive force. In the twin-clutch transmission illustrated by way of example in FIG. 1 to FIG. 4, the forward gears 1, 3, 5 are assigned to the one partial transmission and the forward gears 2, 4, 6 are assigned to the other partial transmission. This permits a sequential gearshift, without an interruption in tractive force, between two adjacent gears even without an electric motor 112, solely on account of the twin-clutch transmission principle by means of gear pre-selection and overlap control of the two friction clutches K1 and K2. The electric motor can however also additionally engage in said sequential gearshifts, so as to smooth the shift, both by outputting power and also by absorbing power.

Omitting one or two clutches, as per FIG. 3 and FIG. 4, provides for advantages of cost-effectiveness, compactness and lightness of the unit and the disadvantage of a reduced functional scope.

In the hybrid transmission of FIG. 2, the electric motor 112 can be connected into the power flow in each of the forward gears 1 to 6 and the reverse gear R.

In the hybrid transmissions of FIG. 3 and FIG. 4, the electric motor 112 can be connected indirectly into the power flow in each of the even forward gears 2, 4 and 6.

When engaging the two shift elements 17 and 22 assigned to the one partial transmission, in the exemplary embodiment as per FIG. 2, the clutch 103 of the electric motor 112 is disengaged whereby the two shift elements 17 and 22 are not subjected to the drag torque of the electric motor 112.

When engaging the two shift elements 34 and 40, in the exemplary embodiment as per FIG. 2, the clutch 102 of the electric motor 112 is disengaged in order that the two shift elements 34 and 40 are not loaded with the drag torque of the electric motor 112.

Alternatively for disengaging the clutch 102 or 103, the electric motor can energized so as to smoothen the shifting, while supplying or absorbing power, depending on whether an upshift or downshift is being carried out.

The shift elements can be embodied both as synchronizing rings and as purely form-fitting shift claws. When using synchronizing rings as shift elements, the friction cones can, with the abovementioned method, be relieved of load, and therefore a long service life even of single-cone synchronizations can be ensured. When using shift claws as shift elements, it is possible with the abovementioned shift-smoothing method to ensure small shift shocks when engaging the shift claws.

The torsional strength, illustrated in the exemplary embodiment, between the hollow shaft 12 and the clutch half 9 or between the inner shaft 11 and the clutch half 8 can also be provided by means of a torsional vibration damper. This permits a limited degree of rotational movement.

The clutches 102, 103 for the electric motor 112 can also have a torsional damper.

The front axle differential can also have, as a drive gearwheel, a conical gearwheel as it is used for vehicles with longitudinal front drives. The front axle differential can likewise have a spur gear as is known from vehicles for front-transverse drive.

The two drive pinions which are situated on the countershafts assigned to the forward gears can have both identical and different diameters.

In a particularly advantageous embodiment of the invention, the starter motor for starting the internal combustion engine and the electric motor for the hybrid drive are dimensioned such that the internal combustion engine, in particular in the cold state, can be started only with both electric motors. The embodiment of the invention permits small and light dimensioning of the starter motor, together with cost advantages.

The clutches 102, 103 of the electric motor in FIG. 2 to FIG. 4 are provided merely by way of example with clutch plates 108, 109. The clutches can, for example, be
dry clutches,
dry or wet multi-plate clutches,
similarly to a synchronizing device,
form-fitting claw clutches or
magnetic clutches.

The arrangement of the hybrid electric motor parallel to the countershafts and main shafts—that is to say the inner shaft and the hollow shaft—of the hybrid twin-clutch transmission is particularly favorable with regard to efficiency and permits a compact design. Other arrangements are however also conceivable, for example a perpendicular arrangement with a bevel wheel gear.

The described embodiments are merely exemplary embodiments. A combination of the described features for different embodiments is likewise possible.

What is claimed is:

1. A transmission design for a hybrid twin-clutch transmission and a twin-clutch transmission including in a transmission housing (99) a main shaft arrangement having two main shafts (11, 12) and two counter shafts (23, 24) with drive power flowing alternatively via the two countershafts (23, 24), said countershafts being arranged parallel to, and at a distance from, one another and the main shaft arrangement, twin clutches (10) arranged at an input end of the transmission for selectively connecting at least one of the main shafts (11, 12) of the main shaft arrangement to an internal combustion engine, said transmission including an internal space for accommodating an electric motor/generator (112) for hybrid function for rotation with one of the main shafts (11, 12) via a step-up stage (93 or 94), the electric motor/generator being rotationally fixedly connected to one clutch (8 or 9) of the twin clutch (10), in such a way as to permit both, recuperation and also exclusive travel drive by means of the electric motor/generator (112), and also a starter Motor (M) provided in order to start the internal combustion engine at least under cold starting conditions.

2. The transmission according to claim 1, wherein the electric motor/generator (112) for the hybrid function is likewise arranged parallel to, and at a distance from, the two countershafts (23, 24).

3. The transmission according to claim 1, wherein a gearwheel of said step-up stage is an axially final gearwheel (42) on said main shaft (11), with the main shaft (11) being rotatably supported, on the side facing away from the twin clutch (10), by a roller-bearing disposed axially adjacent said gearwheel (42) in a transmission housing (99).

4. The transmission according to claim 3, wherein another gearwheel (107) of said step-up stage (94) is rotationally fixedly coupled to an armature (113) of the electric motor/generator (112), which is rotatably supported in the transmission housing (99).

5. The transmission according to claim 3, wherein another gearwheel (107) of said step-up stage (94) can be coupled to, and detached from, the armature (113) of the electric motor (112) by means of a clutch (102).

6. The transmission according to claim 3, wherein said step-up stage (93) comprises at least two gearwheels (15, 106), of a gearwheel plane, which is axially closest to the twin clutch (10), with the main shaft (12) being rotatably supported axially between the one gearwheel (15) and the twin clutch (10) by a roller-bearing in a separating housing wail (98) which is connected to the transmission housing (99).

7. The transmission according to claim 6, wherein a clutch (103) is provided, by means of which a rotationally fixed connection can be established between the other gearwheel (106) and the armature (113) of the electric motor/generator (112).

8. A transmission according to claim 2, wherein two clutches (102, 103) are provided for connecting the electric motor/generator (112) selectively to either of the main shafts (11, 12) for the transfer of power between the main shafts (11, 12) and the motor/generator (112), whereby, in addition and alternatively to, the power from the internal combustion engine,
with the first clutch (102), power from the electric motor/generator (112) can be introduced via a first step-up stage (94) into a first partial transmission, and
with the second clutch (103), power from the electric motor (112) can be introduced via a second step-up stage (93) into a second partial transmission.

9. A hybrid twin-clutch transmission, with two counter shafts (23, 24) which are arranged parallel to, and at a distance from, one another and in which drive power flows alternatively via the two countershafts (23, 24), and with an electric motor/generator (112) having a stator (101). and an armature (113) for hybrid function likewise being arranged parallel to, and at a distance from, the two countershafts (23, 24), and with two clutches (102, 103) being provided with which a power transfer between the armature (113) of the electric motor/generator (112) can be established via one step-up stage (94) with one partial transmission and, alternatively, via another step-up stage (93) with another partial transmission.

* * * * *